United States Patent [19]

Coombes et al.

[11] 4,312,070
[45] Jan. 19, 1982

[54] DIGITAL ENCODER-DECODER

[75] Inventors: Daniel J. Coombes, Winfield; Martin V. Seitz, Fox River Grove, both of Ill.

[73] Assignee: Motorola, Inc., Schaumburg, Ill.

[21] Appl. No.: 101,345

[22] Filed: Dec. 7, 1979

[51] Int. Cl.³ .............................................. G06F 11/10
[52] U.S. Cl. ...................... 371/40; 371/42; 371/45; 371/47
[58] Field of Search ..................... 371/37, 40, 42, 43, 371/45, 46, 47

[56] References Cited

U.S. PATENT DOCUMENTS

| | | | |
|---|---|---|---|
| 3,571,794 | 3/1971 | Tong | 371/42 |
| 3,882,457 | 5/1975 | En | 371/45 |
| 3,988,677 | 10/1976 | Fletcher et al. | 371/45 |
| 4,055,832 | 10/1977 | En | 371/43 |
| 4,156,867 | 5/1979 | Nench et al. | 371/39 |
| 4,206,440 | 6/1980 | Doi et al. | 371/38 |
| 4,229,822 | 10/1980 | Bench | 375/81 |
| 4,271,520 | 6/1981 | Coombes et al. | 371/42 |

OTHER PUBLICATIONS

Peterson and Brown, Cyclic Codes for Error Detection, Proceedings of IEEE, vol. 49, pp. 228–235, Jan. 1961.
Peterson, Error Correcting Codes, MIT Press, 1961, pp. 206–243.
Lin, An Introduction to Error Correcting Codes, Prentice Hall, 1970, pp. 70–83.

*Primary Examiner*—Charles E. Atkinson
*Attorney, Agent, or Firm*—James W. Gillman; Edward M. Roney; James S. Pristelski

[57] ABSTRACT

A digital encoding and decoding system suited for use in a mobile trunked dispatch communication system capable of error correction, error detection, and detection of loss of synchronization. The encoder comprises a cyclic block encoder, an autosynchronization sequence combiner, a convolutional encoder, and a bit interleaver to encode information to be transmitted. The decoder comprises a bit de-interleaver, a convolutional decoder, an autosynchronization sequence combiner, and a cyclical block decoder to recover the transmitted information and also indicates whether any errors are present in the recovered information.

10 Claims, 23 Drawing Figures

FIG. 6

1. DATA BITS K=27

$D_0 D_1 D_2 \cdots D_{25} D_{26}$ — 27 BITS 2. (37,27) BLOCK CODE N=37 K=27

$D_0 D_1 D_2 \cdots D_{25} D_{26} D_{27} D_{28} \cdots D_{36}$ — 37 BITS 3. 37 BIT AUTO SYNC SEQUENCE A = \$1987O3565B 1 1 0 0 1 ... 1 · 0 1 1 — 37 BITS

4. CONCATENATED CODE I = D ⊕ A $I_0 I_1 I_2 I_3 I_4 \cdots I_{33} I_{34} I_{35} I_{36}$ — 37 BITS

5. RATE ONE HALF CONVOLUTIONAL CODE $I_0 P_0 I_1 P_1 | I_2 P_2 I_3 P_3 | I_4 P_4 \cdots I_{35} P_{35} | I_{36} P_{36} O P_{37}$ — 76 BITS

6. BIT INTERLEAVE M=4 L=19

$I_0 I_2 I_4 \cdots I_{36} | P_0 P_2 P_4 \cdots P_{36} | I_1 I_3 I_5 \cdots I_{35} O | P_1 P_3 P_5 \cdots P_{37}$ — 76 BITS

7. SYNC PREAMBLE APPENDED \$AC $10101100 | I_0 I_2 I_4 \cdots I_{36} | P_0 P_2 P_4 \cdots P_{36} | I_1 I_3 I_5 \cdots I_{35} O | P_1 P_3 P_5 \cdots P_{37}$ — 84 BITS

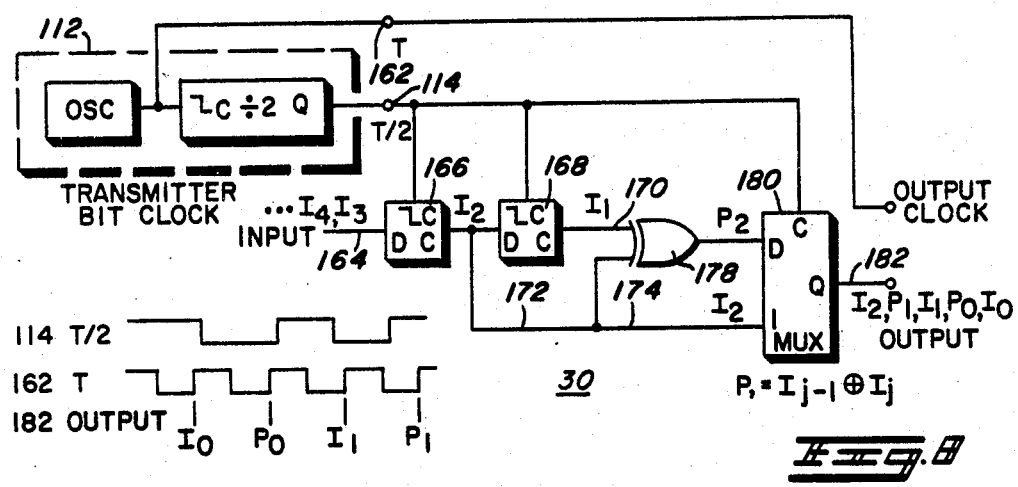
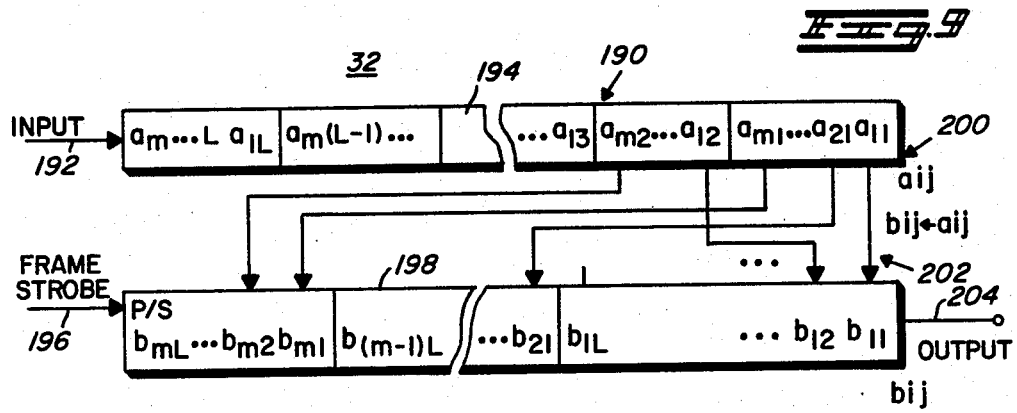
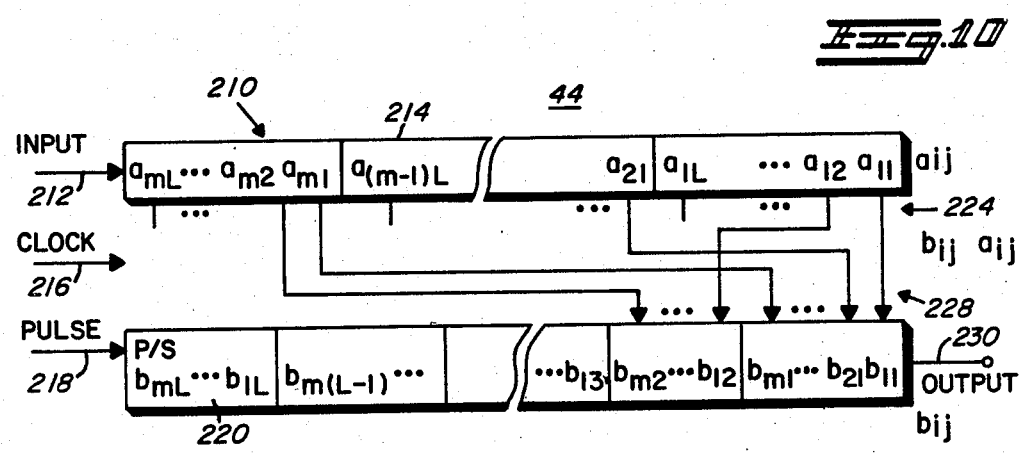

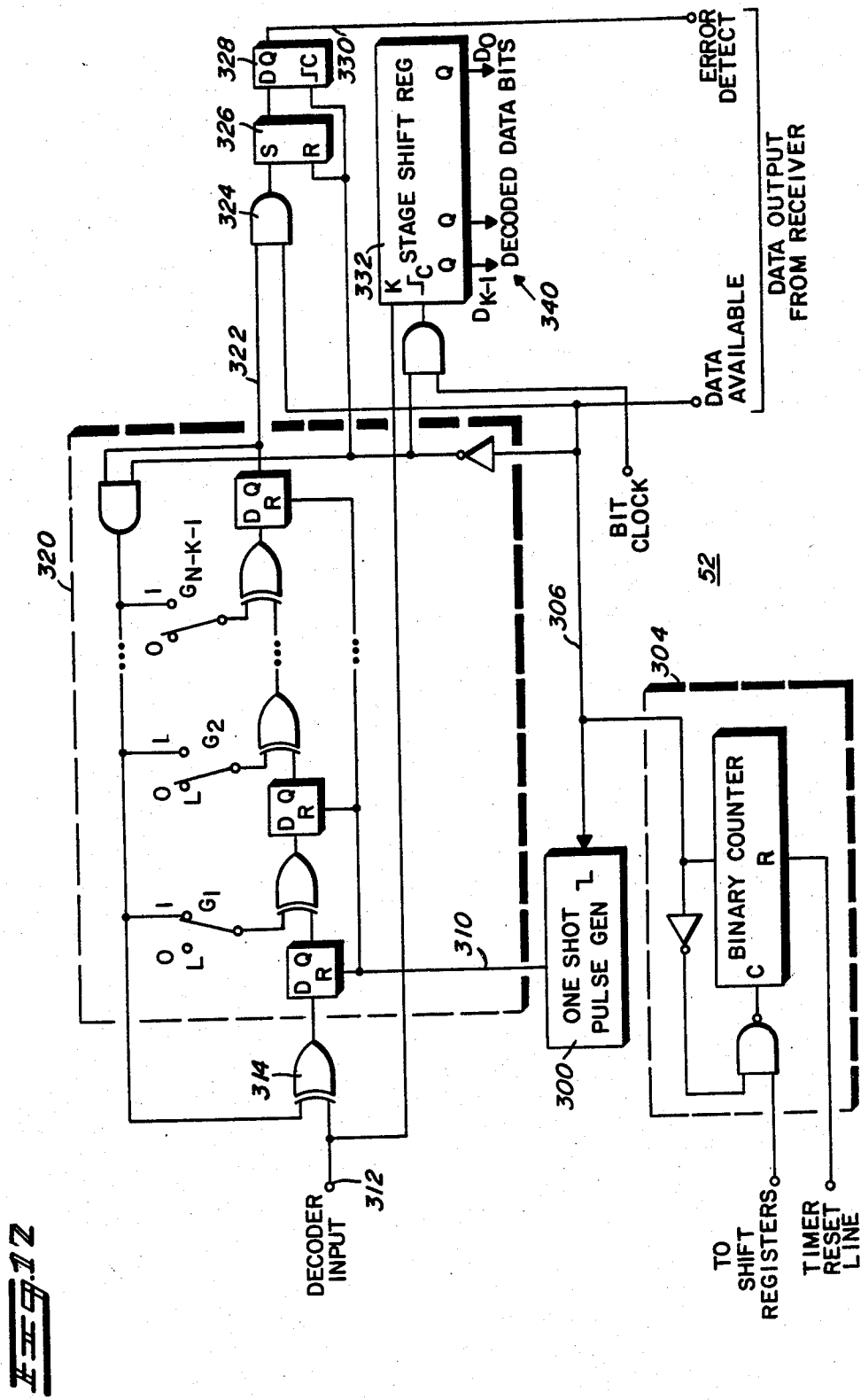

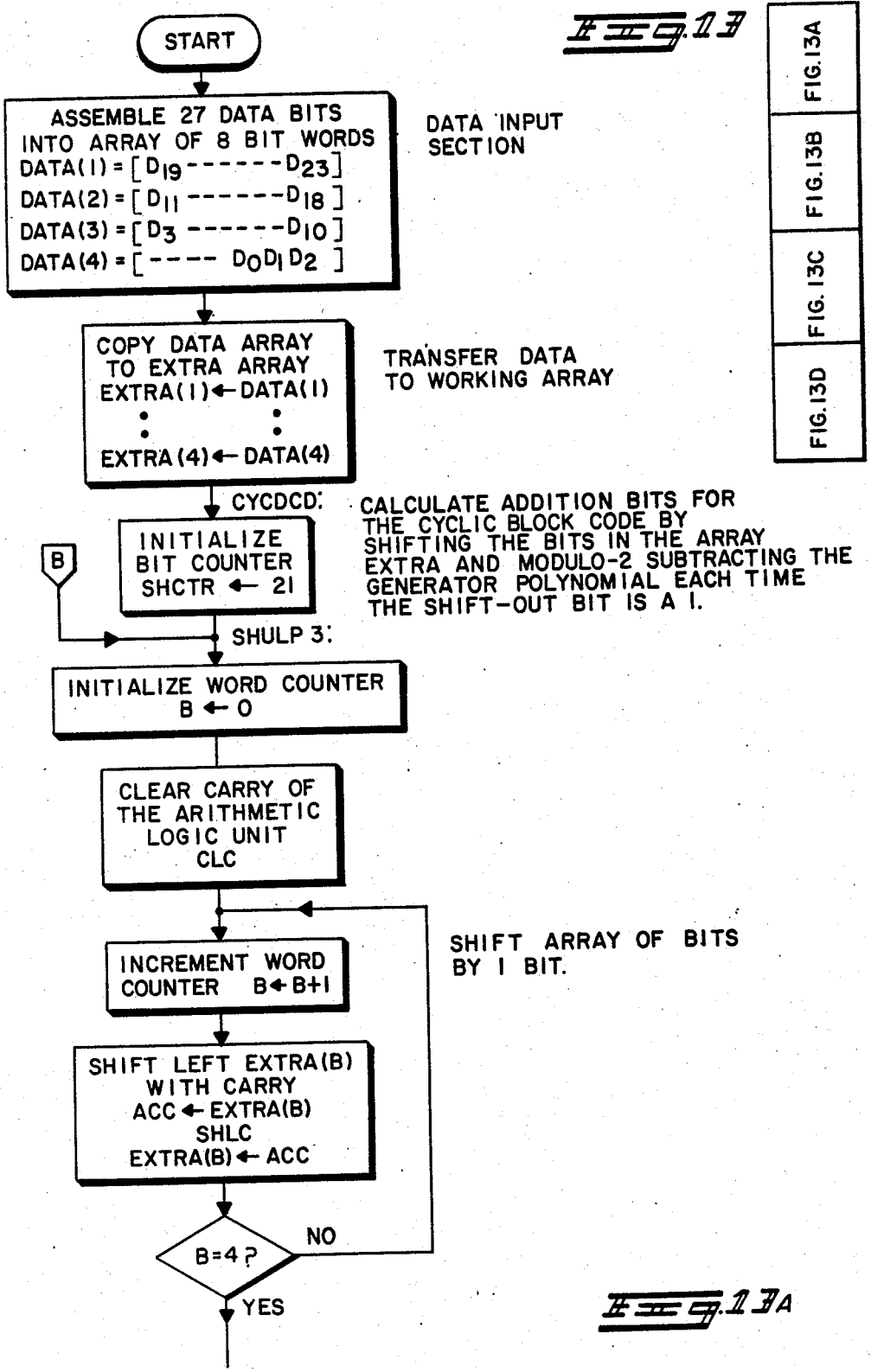

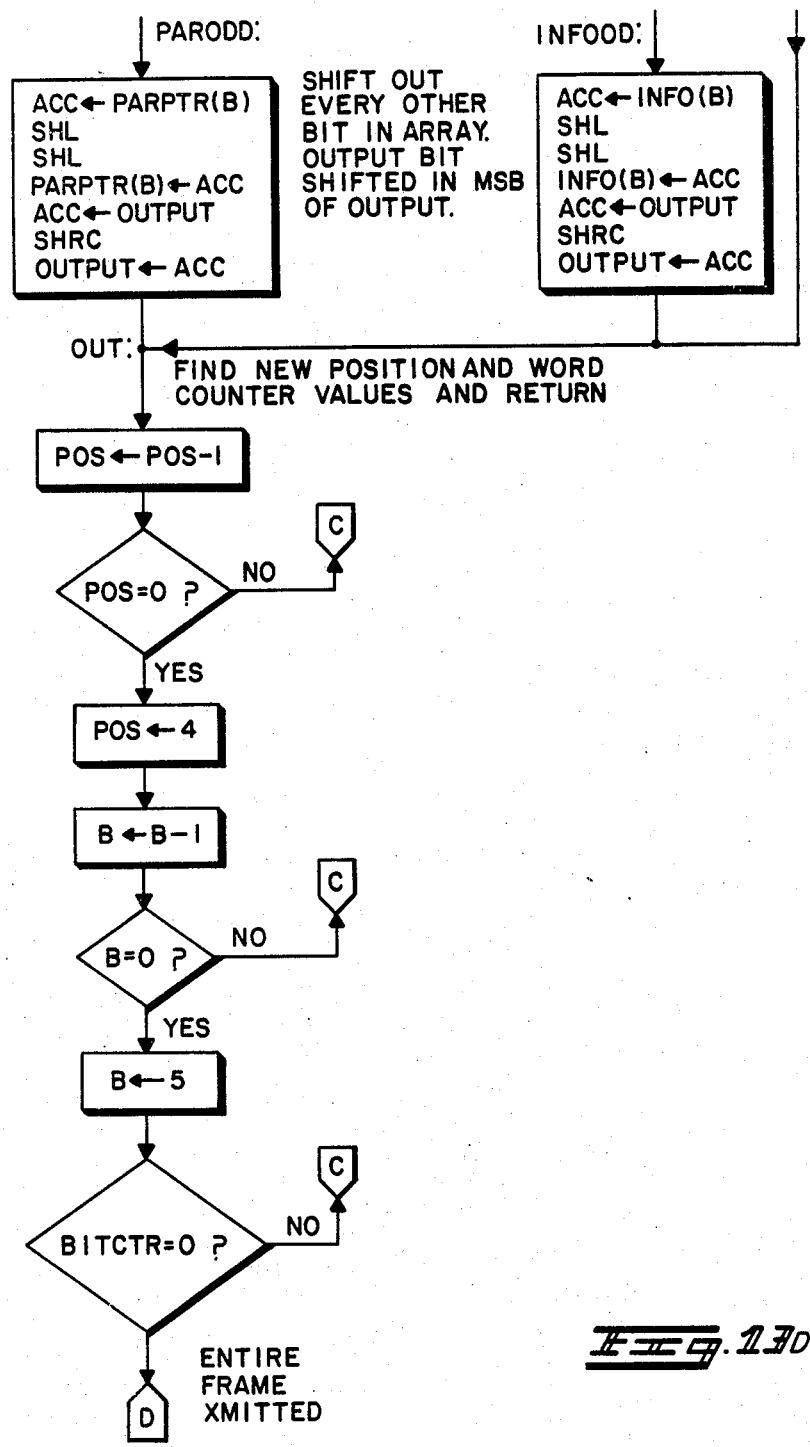

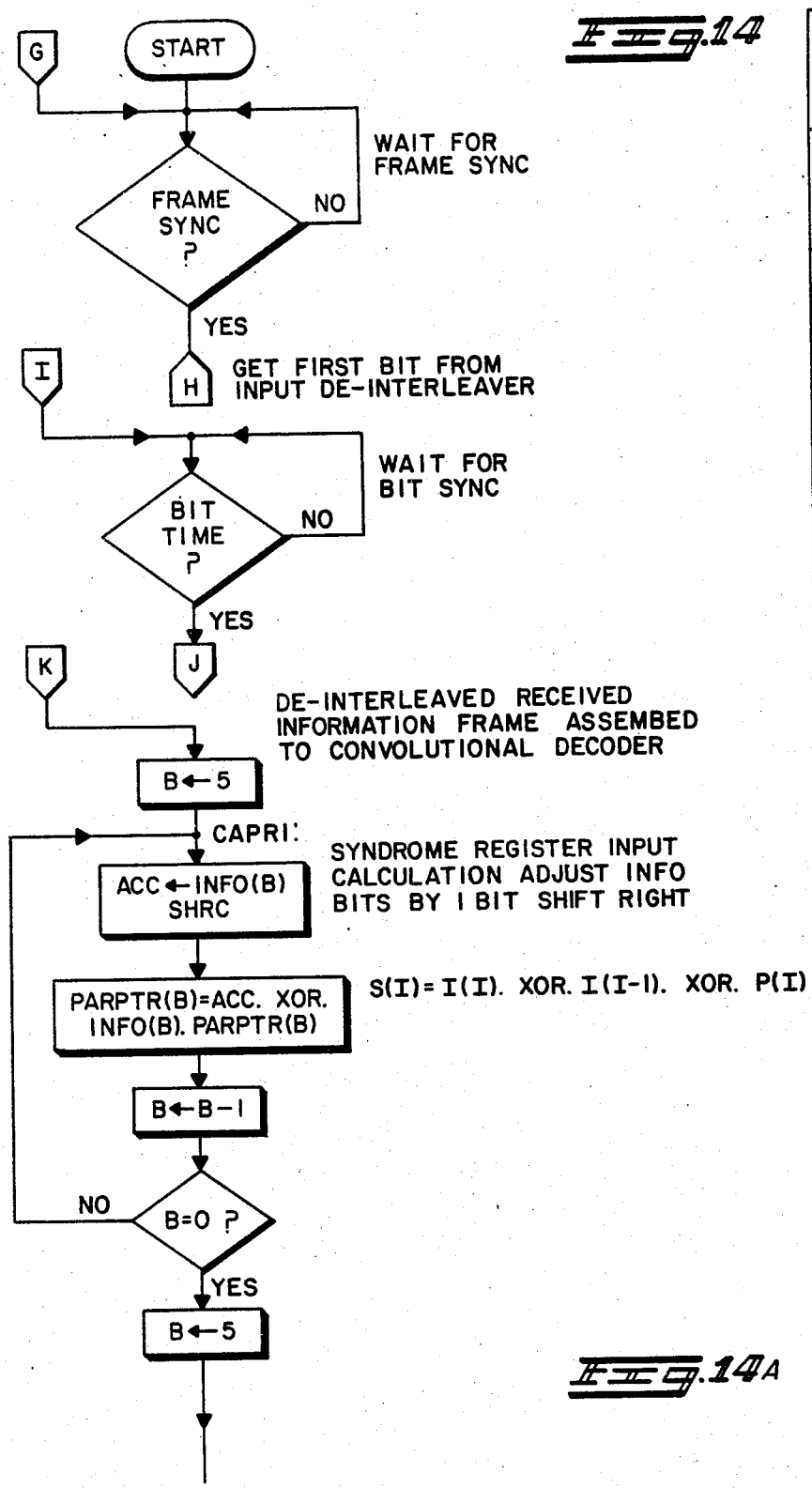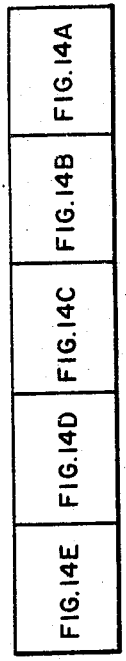
FIG.14
FIG.14A

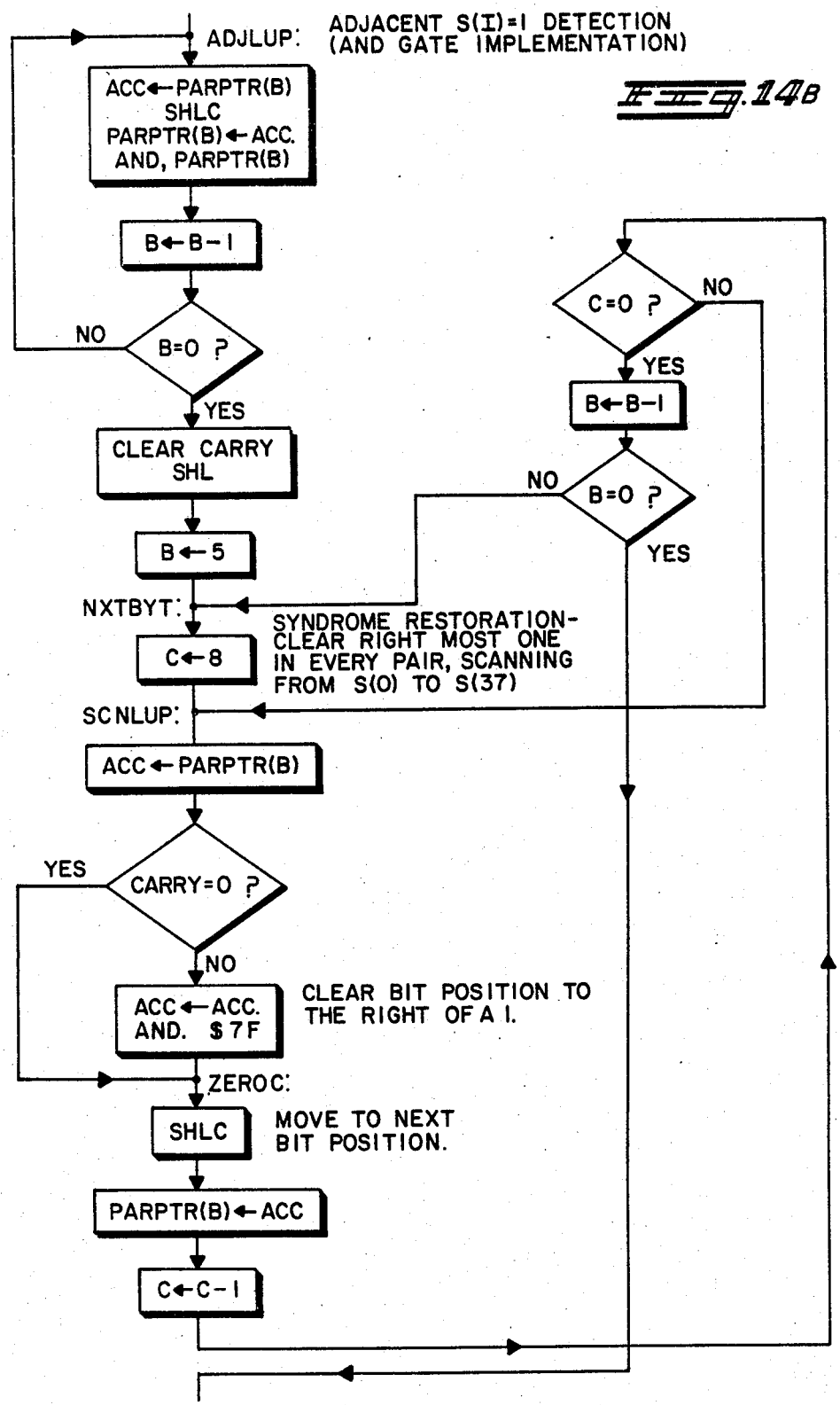

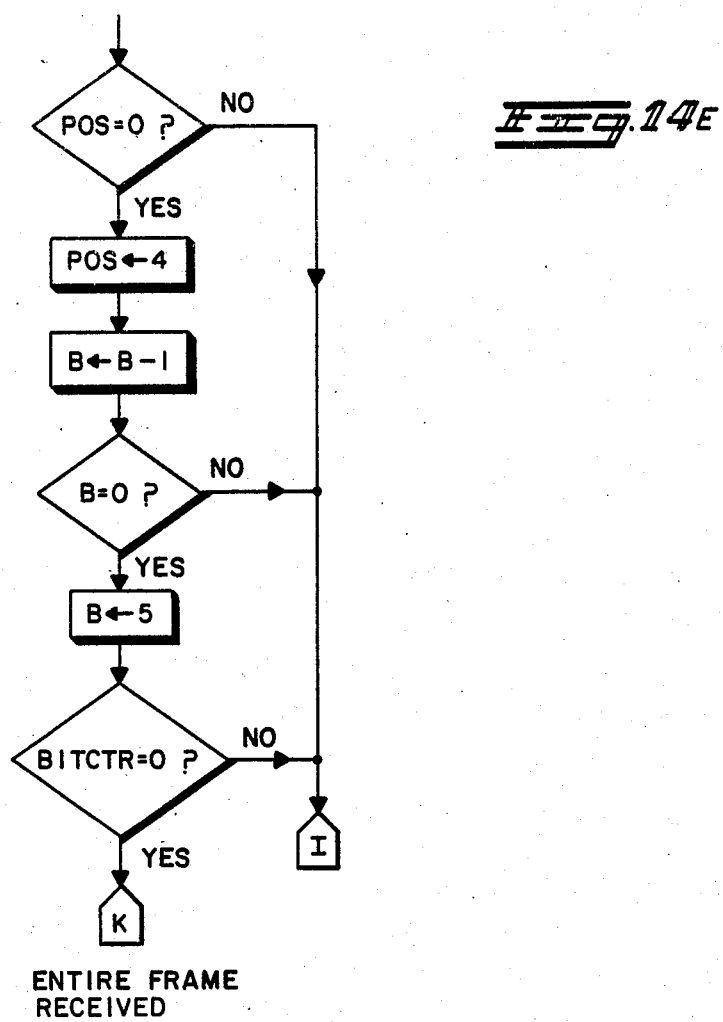

DIGITAL ENCODER-DECODER

BACKGROUND OF THE INVENTION

This invention relates generally to error correction and detection in a digital communications system, and more particularly to coding digital transmission of short messages including interleaving and convolutional coding for burst error correction, and cyclic block coding for error detection with minimal compromise in signalling sensitivity.

Convolutional coding is a known technique for error correction, and several methods are available for its implementation. Such methods are discussed in the system described in U.S. Pat. No. 4,055,832 issued Oct. 25, 1977, to John En, which is assigned to the same assignee as the present invention.

Burst error correction may be accomplished by known methods, such as, for example, methods utilized by the system described in U.S. Pat. No. 3,882,457 issued May 6, 1975 to John En and also assigned to the assignee of the present invention.

Cyclic block coding is a known coding technique that is extremely well suited for error detection as described in W. W. Peterson and D. T. Brown, "Cyclic Coding for Error Detection", Proceedings of the IEEE, Vol. 49, at pp. 228-35, (January, 1961); and W. W. Peterson, "Error Correction Codes", the MIT Press, Cambridge, Massachusetts, and John Wiley, New York (1961). Some methods for implementing cyclic block codes are also available to those skilled in the art, as described in Shu Lin, "An Introduction to Error Correcting Codes", at pp. 70-83, Prentice Hall, Englewood Cliffs, New Jersey (1970).

The use of bit interleaving in conjunction with a Hamming code for correction of burst errors is disclosed in a presently pending U.S. Patent Application, Ser. No. 7,086, filed Jan. 29, 1979, now U.S. Pat. No. 4,229,822, issued Oct. 21, 1980, by Steven Bench, and which is also assigned to the assignee of the present invention.

Techniques for using cyclic block codes for short messages and resolving the inherent synchronization problem by combining the block codes with an autosynchronization sequence is disclosed in a presently pending U.S. Patent Application, Ser. No. 51,938, filed June 25, 1979, now U.S. Pat. No. 4,271,520, issued June 2, 1981, by Daniel J. Coombes et al, and which is assigned to the assignee of the present invention.

While most of these separate techniques are known and general in their application, it has not heretofore been known that they would be combined into a single coding scheme having non-complex implementation and broad application to coding of short messages, without losing the effectiveness of each individual technique or compromising the signalling sensitivity of the resultant communication system.

SUMMARY OF THE INVENTION

It is an object of the present invention to provide improved methods of error correction and detection in digital communication systems to enable highly reliable data communications to the fringes of the systems coverage area of the system.

A related object of the invention is to provide improved communication methods having a high degree of error correction and detection for short messages in a digital communications system with minimal effect on signalling sensitivity performance.

Another object of the invention is to provide an improved method for coding blocks of digital control signals in a control channel of a mobile communications trunked dispatch system.

Yet another object of the present invention is to provide encoding and decoding means for data communications systems which incorporate these improved methods.

Briefly, in accordance with a preferred embodiment of the present invention, digital information is transmitted in coded information frames prefixed by short synchronization sequences. Data is encoded by an encoder comprising a cyclic block coder, a stored autosynchronization frame, an exclusive-OR gate, a convolutional coder, and a bit interleave circuit. The coded information frame is decoded by a decoder comprising a bit de-interleave circuit, a convolutional decoder, a stored autosynchronization frame, an exclusive-OR gate, and a cyclic block decoder.

In accordance with the methods of the present invention, the encoder in the transmitter encodes the digital data in a block code format which imparts a high degree of error detection capability to the corresponding block decoder at the receiver. The block code is then exclusive-OR'ed with an autosynchronization frame, which enables the block decoder at the receiver to detect if the receiver is out of synchronization with the transmitter. The exclusive-OR result is then encoded using a rate one-half convolutional code which imparts a high degree of random error correction capability to the convolutional decoder at the receiver. The convolutional code is then bit interleaved for transmission so that burst errors are converted to random errors by the corresponding bit de-interleave at the receiver. Thus, the decoder at the receiver operates in an inverse manner to that of the encoder and can correct burst errors and detect uncorrected errors or synchronization problems.

DESCRIPTION OF THE DRAWINGS

FIG. 6 is a more detailed illustration of the sequence of steps for encoding a short message into the format for the control channel of the trunked dispatch mobile communication system.

FIG. 8 is a schematic diagram of a logic circuit for implementing the convolutional encoding step of the encoding method.

FIG. 9 is a schematic diagram of a logic circuit implementation of the bit interleave step of the encoding method.

FIG. 10 is a schematic diagram of a logic circuit implementation of the bit de-interleave step of the decoding method relating to the circuit shown in FIG. 9.

FIG. 12 is a schematic diagram of a logic circuit for implementing the cyclic block decoding step of the decoding method relating to the cyclic block encoder in FIG. 7.

DESCRIPTION OF THE PREFERRED EMBODIMENT

Figure 1:
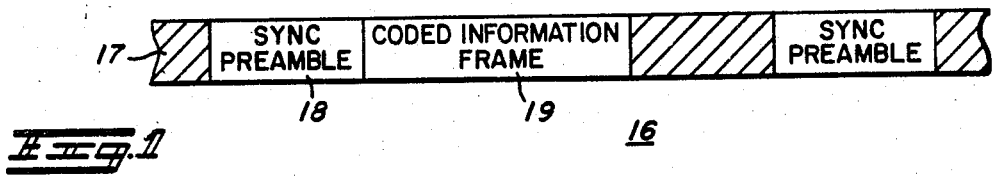
FIG. 1 is an illustration of a typical format for short messages for transmission over digital communication systems in accordance with the present invention.

FIG. 1 illustrates a digital transmission format for transmitting short digital messages over a channel in a digital communication system, as, for example, over a control channel of a trunked dispatch communication system. A signal 16 in FIG. 1 is shown as it would appear on an oscilloscope; the information on the left precedes that on the right, in time. A receiver tuned to the signal 16 would receive noise, until it receives a synchronization, or "sync" pattern as in the form of sync preamble 18. The sync pattern is used by the receiver to find the instant of time at which the binary bits of information, as in the form of a coded information frame 19, are located, or the bit clock phase, and the time at which the information bits should appear. The coded information then appears in a frame 19 of predetermined length. In any real-world communication system, the received information will not be precisely the same as the transmitted information. Noise in the communications channel causes errors in the received information frame, particularly in the transmission to or from the fringes of the coverage area in the communication system. In an FM mobile communications channel these errors usually occur in bursts rather than appearing as random events.

Coding is a technique whereby bits are added to the data before transmission so that most errors can be detected or corrected at the receiver. The instant invention relates to improved methods for coding which are general in application and particularly useful for short digital messages used in mobile communications systems. The present invention is also concerned with an encoder and decoder for such a system which utilizes these coding methods.

Operation of the encoder-decoder is best explained by a general description of the system, followed by a specific example illustrating how the actual data is processed in a typical application.

Figure 2:
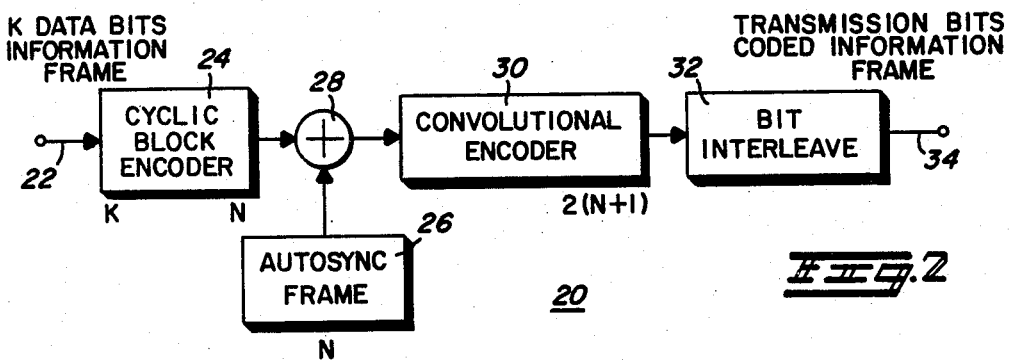
FIG. 2 is a block diagram of an encoder portion of a communication system for encoding messages to be transmitted over the system.

Referring to FIG. 2, there is shown a block diagram of an encoder, generally designated 20, for the system according to the invention. The encoder has an input 22 which receives a group of data bits comprising an information frame to be coded for transmission. A cyclic block coder 24 receives the data bits and generates a cyclic block code by adding additional bits which are functionally related to the data bits. The parameters K, the number of input bits, and N, the number of output bits, are conventional block code notations and are sometimes written as (N,K) to describe the particular code used. The block code is combined by a combiner means 28 with an N bit autosynchronization or "autosync" frame which is a predetermined sequence stored in a storage means. The result of combiner 28, an N bit sequence referred to as a concantenated code, is received by a convolutional encoder 30. The convolutional encoder adds N plus 2 bits, for a total of 2(N+1) bits which are then received by the bit interleave means 32 and scrambled for transmission on an encoder output line 34.

The combiner means 28 of encoder 20 can be an exclusive-OR gate which serially accepts output bits from the cyclic block encoder 24, and serially accepts bits from storage 26 such as a parallel to serial shift register with the parallel input strapped with the autosync frame, for example, the autosync sequence shown in step 3 of FIG. 6. If a microprocessor implementation is preferred, the bit-by-bit exclusive-OR may be performed a byte at a time. The resultant combiner means output is shown in step 4 of FIG. 6.

Figure 3:
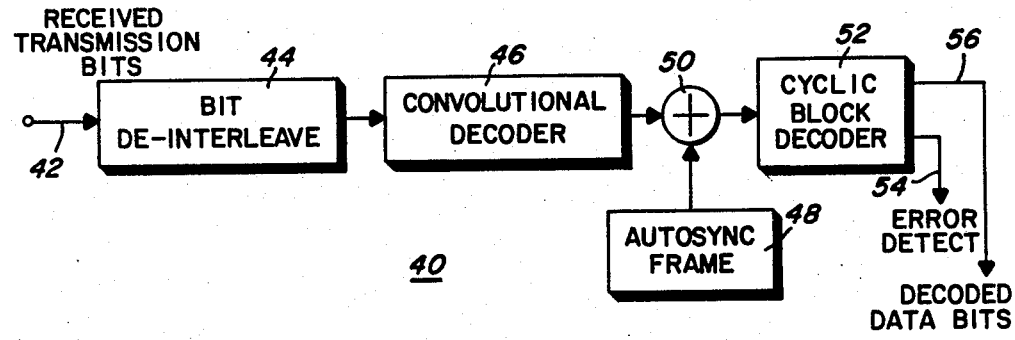
FIG. 3 is a block diagram of a decoder of the communication system for receiving and decoding encoded messages from the encoder in FIG. 2.

A decoder, generally designated 40, for the system is shown in the block diagram of FIG. 3. The decoder resides at the receiver and accepts the received transmission bits on a decoder input line 42. The received transmission bits, which may include errors, are unscrambled by a bit de-interleave means 44 which performs the inverse function of the encoder bit interleave means 32 in FIG. 2. The result is convolutionally decoded by a convolutional decoder 46 which corrects most of the errors. The result is an error-corrected copy of the concatenated code which will include the remaining uncorrected errors. This error-corrected code is received by combining means 50 which also receives a copy of the autosynchronization frame 48 previously stored in storage means and combines it with the error-corrected code. If the receiver and transmitter are in synchronization, the combiner means removes the autosynchronization sequence impressed at the transmitter and presents a copy of the block code as generated by the cyclic block coder 24 of the encoder 20 to a cyclic block decoder 52. However, if the receiver and transmitter are not in synchronization, the combining of the autosynchronization frame by the combiner 50 will not effectively strip off the autosynchronization sequence which was impressed by the encoder 20, but instead will generate an error pattern. The cyclic block decoder 52 would ordinarily not detect a synchronization error since it effectively causes a cyclical shift of a valid block code word which is itself a valid block code word. This property of cyclic block codes is sometimes used to define a meaning of "cyclical" codes. The cyclical block decoder 52 accepts the output of the combiner 50 and generates decoded data bits on an output line 56 and also generates an error-detect signal on an error output line 54.

Figure 4:
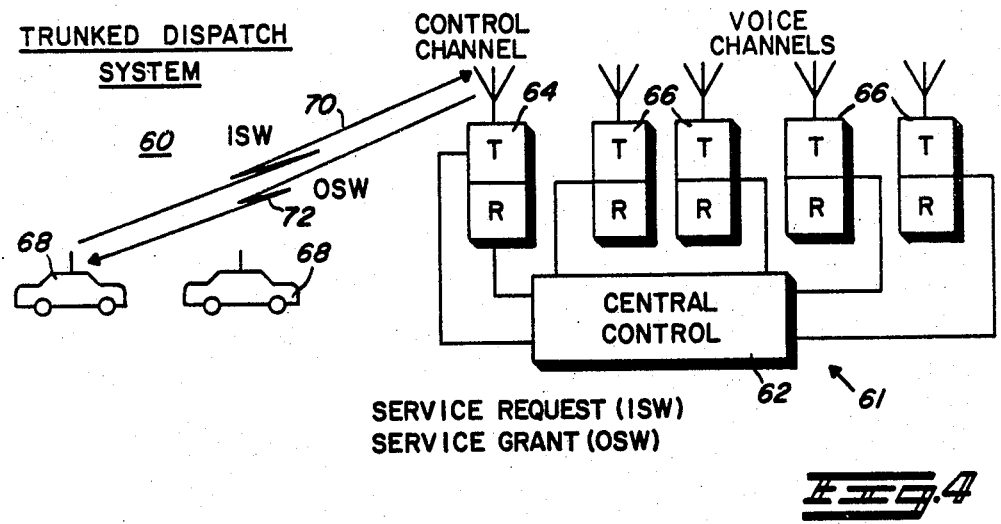
FIG. 4 is a block diagram of a typical mobile communications trunked dispatch system, which includes the encoder and decoder of the present invention.

A typical application of the digital encoder-decoder in a trunked dispatch system, designated generally 60, is shown in FIG. 4. This type of communication system is configured around a plurality of RF communications channels, and is used to provide voice communication service to mobile units 68 in the field of coverage. One of the RF channels 64 is dedicated to system control and is used exclusively to "set up" voice communication links 66 on one or more of the remaining RF channels. This control channel is a fully duplex RF communications channel which is used to carry digital data messages from a central controller to the mobile units and likewise from the remote mobile units to the central controller. The actual channel that the digital control channel 64 resides on is fully compatible with the voice channels 66.

Figure 5:
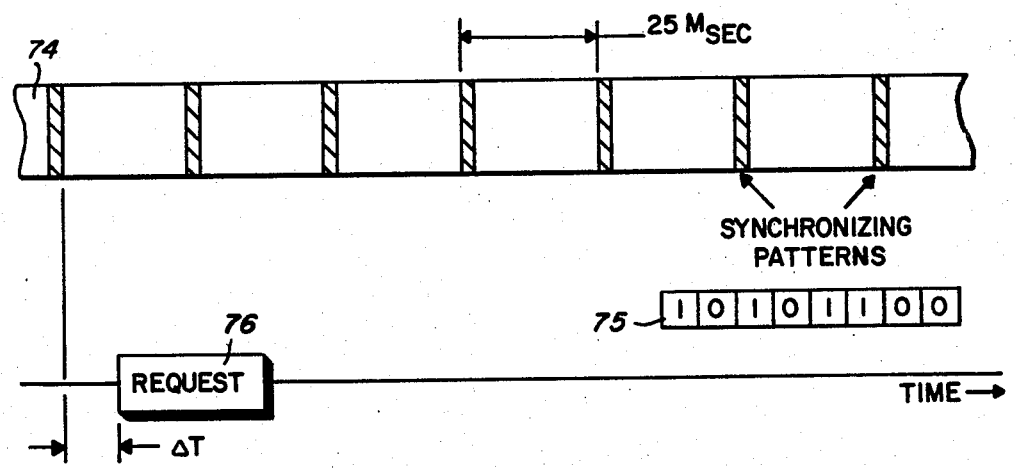
FIG. 5 is an illustration of the trunked dispatch digital transmission format for a control channel in the system in FIG. 4.

Data is transmitted in packets of uniform length on the system control channel 64 as shown in FIG. 5. A continuous stream of data packets 74, interleaved with synchronization patterns 75, is broadcast by a central controller 62 in FIG. 4, outbound to the mobile units within the field of RF coverage. Inbound data communications 70, from remote field units 68 to the central base site 61, are accomplished in the slotted contention mode, wherein incoming data transmission 70 are keyed to the time of detection of synchronization patterns in the outbound data 72.

The encoding process is summarized in FIG. 6. In step 1, a packet of 27 data bits 82, are assembled by the central controller. These data bits represent mobile unit addresses, RF channel voice designations, and special functions for selectively calling subsets, also known as fleets, of mobile units, and for other special functions that may be added.

In step 2, the data bits are passed to a (37, 27) block encoder which appends 10 additional bits, designated as $D_{27}$ through $D_{36}$. These additional bits will be utilized for error detection in the data recovery process. The (37, 27) block code 84 is generated by foreshortening a cyclic (45, 35) block code, which is a known technique for deriving new codes by using code vectors from the longer code which have zero information bits for the deleted bit positions. In general, the shortened cyclic code has at least the same error-correcting capability as the code from which it is derived, and the encoding and decoding circuits for the original code can be used if the zeros are deleted after encoding and inserted before decoding. The (45, 35) cyclical block code was chosen because it has well known properties and works especially well for detecting errors after the convolutional decoding and error-correction process.

In step 3 of FIG. 6 an autosynchronization sequence 86 is recalled from storage, which may be either wired into the circuit or be stored in memory. This sequence, $198703565B (hexadecimal), was designed to exhibit very low degrees of correlation to its cyclic rotations.

In step 4 the autosynchronization sequence 86 is added to the block code 84 by modulo-2 (exclusive-OR) addition of the corresponding individual bits. For example, the first bit $I_0$ of the result, the concatenated code, is the exclusive-OR of the first bit of the autosynchronization $A_0$ and the first bit of the block code $D_0$. This imparts to the concatenated code the same low degree of correlation to its cyclic rotations as was designed into the autosynchronization sequence.

In step 5 of FIG. 6 the concatenated code 88, bits $I_0$ to $I_{36}$, are passed through a rate one-half convolutional encoder which, in turn, generates 38 parity bits designated $P_0$ to $P_{37}$. This level of coding provides for a very high level of random error correction capability at the convolutional decoder. The rate one-half convolutional encoder also generates a dummy zero flush-out bit just before the last parity bit $P_{37}$. Since a convolutional code is sent as a fixed length block, there must be one more parity bit and information bit, and for simplicity it is desirable to insert this flush-out bit which provides a time delay to simplify decoding.

In step 6 the coded information frame 92 is derived by interleaving the bits from the rate one-half convolutional encoder 90. As a result of this operation, the even number concatenated code bits $I_0$ to $I_{36}$ are transmitted first, followed by the even numbered parity bits $P_0$ to $P_{36}$, followed by the odd numbered concatenated code bits $I_1$ to $I_{35}$, and the flush-out bit and lastly odd numbered parity bits $P_1$ to $P_{37}$. The interleaving of bits introduces a degree of time diversity into the signalling scheme so that each concatenated code bit is far removed from its associated parity bit. This bit interleaving ensures that lengthy signal fades, which are commonly encountered on mobile RF channels and generate burst errors, will have a minimal effect on the error correction capability of the convolutional coder.

In step 7 the asynchronous transmission format 94 for the trunked system is completed by appending a 8-bit sync preamble to the coded information frame. The sync preamble is a sequence of bits that is highly uncorrelated to its out-of-phase positions. However, it is not necessary that a long sync preamble be used since that autosynchronization technique used in the coding process guarantees that any failure of the receiver to properly synchronize on the sync preamble will be detected by the block decoder and will not result in improperly decoded data. It will be understood by those skilled in the art that synchronization of decoder could be achieved solely by means of the autosynchronization frame by serially sampling the bits of the received message and then assuming that synchronization is obtained when no error is detected. However, the 8-bit sync preamble is preferred since it permits more rapid synchronization.

The preferred implementation of the coding and decoding in any system as complex as a trunked dispatch system will usually be by microprocessor or microcomputer. However, in less complex systems the preferred implementation may be digital logic circuits, which could be embodied in a single custom large-scale integrated circuit.

The specific manner of implementing the components and steps of the encoder-decoder may be by either a hardware implementation or by software executed in a stored program computing means such as a microprocessor or microcomputer. The general methods and the hardware embodiment of the present invention will be presented first, followed by the preferred software embodiment of the invention.

The cyclic block encoder 24 shown in FIG. 2 accepts K input data bits $D_0$ to $D_{K-1}$, for example, shown in step 1 of FIG. 6 as data bits $D_0$ to $D_{26}$, and adds additional bits $D_K$ to $D_{N-1}$, for example, shown in step 2 of FIG. 6 as additional bits $D_{27}$ to $D_{36}$ which are functionally related to the input bits so that transmission errors can be detected. In general, there are K-1 constants $h_i$ called parity coefficients such that;

$$D_k = D_0 \oplus h_1 D_1 \oplus h_2 D_2 \oplus \ldots \oplus D_{(k-1)} h_{(k-1)} \quad (1)$$

$$D_{(k+1)} = D_1 \oplus h_1 D_2 \oplus h_2 D_3 \oplus \ldots \oplus D_k h_{(k-1)} \quad (2)$$

$$D_{(k+1)} = D_i \oplus h_1 D_{(i+1)} \oplus h_2 D_{(i+2)} \oplus \ldots \oplus D_{(k-i-1)} h_{(k-1)} \quad (3)$$

$$D_{(n-k-j)} = \sum_{i=0}^{k-1} h_i D_{(n-j-i)} \text{ for } 1 \leq j \leq n - k \quad (4)$$

Figure 7:
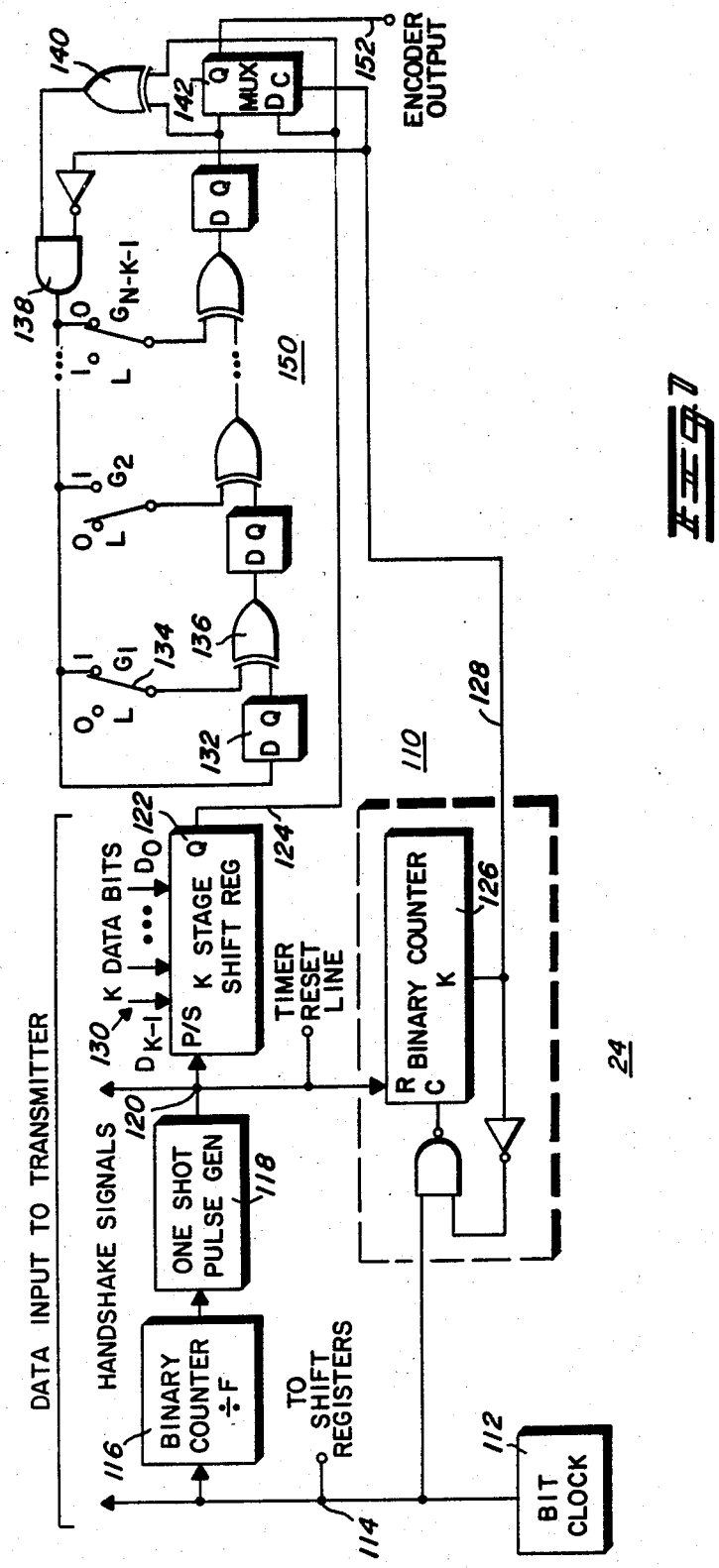
FIG. 7 is a schematic diagram of a typical logic circuit for implementing the cyclic block encoding step of the encoding method including, also, timing and input circuits.

It will be readily apparent to persons skilled in the digital arts that these calculations can be carried out directly in a microprocessor, or in a K stage shift register circuit with one shift register stage for each $h_i$ factor. If there are less additional bits than original bits, i.e., if $N-K$ is less than K, than a simpler implementation using only $N-K$ shift registers is preferred. In the instant invention this will generally be the case since the cyclic block code is used for error detection rather than error correction. In this case the circuit is based on the generator polynomial $$g(X) = \frac{X^{n-1}}{h(x)} \text{ where} \quad (5)$$

$$h(X) = 1 + h_1 X + h_2 X^2 + \ldots + h_{(k-1)} X^{(k-1)} + X^k \quad (6)$$

$$g(X) = 1 + g_1 X + g_2 X^2 + \ldots + g_{(n-k-1)} X^{(n-k-1)} + X^{(n-k)} \quad (7)$$

and the arithmetic is modulo-2. A cyclic block encoder circuit implementation is shown in FIG. 7 and is generally designated 24. The circuit calculates the additional bits $D_K$ to $D_{n-1}$ as the remainder of the modulo-2 division of the polynomial $$D_0 X^{(n-k)} + D_1 X^{(n-k+1)} + \ldots + D_{(k-1)} X^{(n-1)} \quad (8)$$

by g(X).

FIG. 7 also illustrates the input circuits to the cyclic block encoder and also shows the timing circuit which is similar to the timing circuits necessary for the other functional blocks if they are serially implemented. The circuit of FIG. 7 is a synchronous circuit thus requiring a master bit clock 112 which generates a clock signal on a line 114 that synchronizes the shifting in the shift registers. The bit clock is also divided by the number of bits per frame, F, to derive a frame strobe at the frame repetition rate, using a binary counter 116 and a one-shot pulse generator 118. The frame strobe is used to frame synchronize the operations in the encoder. For example, coincident with the frame strobe the K data bits that are the input to the encoder and generally designated 130 are accepted by a parallel-input serial-output K stage shift register 122. This shift register generates the original serial bit stream on line 124 that is used as the input to the cyclic block encoder 150. The timer circuit, generally designated 110 is a typical timing circuit accepting the bit clock on line 114 and the frame strobe on line 120 and generating a low-to-high signal occurring K bits after the frame strobe. The timer output 128 is used by the cyclic block encoder 150 to signal the fact that the K data bits for shift register 122 have all been shifted out on line 124.

The convolutional encoder 30 may be implemented as shown in FIG. 8. This particular circuit is a rate one-half convolutional encoder and is disclosed in the aforementioned U.S. Pat. No. 4,055,832. It should be noted in FIG. 8 that since the convolutional encoder is a rate one-half encoder, there are twice as many output bits as there are input bits, as can be appreciated from a comparison of steps 4 and 5 in FIG. 6. Thus the output clock must run at twice the frequency as the clock used to clock in the input data on line 164. This means that a transmitter clock 112 in FIG. 8 must be composed on a master oscillator that is then divided by two to generate the signal on a clock output line 114. Thus on line 162 there is an output clock running at twice the frequency of the input data on line 164. It should be noted that from the timing diagram in FIG. 8 that the output bits must be sampled during the low-to-high transitions of the output clock on line 162.

The circuit in FIG. 8 generates a convolutional code by accepting the input bits on line 164 and shifting them into shift registers 166 and 168. Every pair of adjacent input bits is then exclusive-OR'ed by gate 174 to generate parity bits. Multiplexer 180 alternates the input bits with the parity bits to produce the convolutional code appearing on line 182; an example of which is shown in step 5 of FIG. 6.

Convolutional encoding is particularly well suited for random error correction. Such convolutional coding techniques have been adapted to burst error correction; for example, in the aforementioned U.S. Pat. No. 3,882,457. Burst error correcton techniques basically involve translating the parity bits in time so that the parity bits are far removed from the information bits. For a simple convolutional encoder or decoder such as shown in FIGS. 7 and 12 respectively, and for fixed frame length it is preferable to consider the translation or scrambling of bits as a separate bit interleave operation.

The bit interleave 32 of the aforementioned encoder 20 in FIG. 2 can be defined as a matrix operation. Let M and L be integers, with M less than or equal to L, of the number of bits in the coded information frame, Z. For example, if N is chosen and an odd number, then Z equals 2(N+1) can factor with M=4. The input frame to the interleaving operation can be designated as elements of a one dimensional array INREG of length Z; then the output frame from the interleaving operation is a one dimensional array OUTREG of length Z such that OUTREG (I(M−1)+J)=INREG (I+J(I−1)) for all combinations of integral indices I and J for I ranging from 1 to L, and J ranging from 1 to N. The bit de-interleave 44 of the decoder 40 in FIG. 3 is just the inverse operation and is as defined as OUTREG(I+J(L−1))=INREG(I(M−1)+J).

The interleave operation can be embodied with a serial-input parallel-output shift register circuit as shown in FIG. 9. The input bits are accepted on line 192 which is the serial input of a serial-input parallel-output shift register 194. The parallel outputs of this register generally designated 200 are wired to corresponding parallel inputs generally designated 202 of the parallel-input serial-output shift register 198. These inputs are accepted by the parallel input register on a frame strobe on line 196 which occurs after the serial-input parallel-output shift register 194 is fully loaded with the frame of input data. This frame strobe is generated by a conventional timing circuit similar to the circuit 110 shown in FIG. 7, followed by a one-shot circuit. The output of the parallel-input serial-output shift register 198, appearing on line 204, is the output for the interleave circuit. An example of the interleaved data packet at line 204 is shown in step 6 of FIG. 6. It should be noted that the actual interleave operation is performed by the connections between the two shift registers, and the layout of these connections is greatly simplified if the shift registers are laid out as an L by M array. The interleave operation can also be simply performed by a miroprocessor (not shown) using the steps shown in Table 1.

TABLE 1

| INTERLEAVING STEPS |
|---|
| BIT    K ← K + 1 |
|         INREG(K) ← INPUT |

TABLE 1-continued
INTERLEAVING STEPS

```
         OUTPUT ← OUTREG(K)
         IF(K < Z) RETURN
FRAME    K ← 0
         i ← 0
         j ← 0
LOOPA    j ← j + 1
LOOPB    i ← i + 1
         OUTREG(i(M − 1) + j) ← INREG(i + j (L − 1))
         IF (i < L) GO TO LOOPB
         i ← 0
         IF (j < M) GO TO LOOPA
         RETURN
```

A synchronization preamble may also be added to the interleaved data packet before transmission of the data, as shown in step 7 of FIG. 6.

The de-interleaving circuit 44 of the decoder 40 in FIG. 3, can be implemented using shift registers as shown in FIG. 10. The circuit in FIG. 10 performs in an inverse manner to the circuit in FIG. 9. A microprocessor (not shown) may also be used to implement the de-interleave operation using the steps shown in Table 2.

TABLE 2
DE-INTERLEAVING STEPS

```
BIT      K ← K + 1
         INREG(K) ← INPUT
         OUTPUT ← OUTREG(K)
         IF (K < Z) RETURN
FRAME    K ← 0
         i ← 0
         j ← 0
LOOPA    j ← j + 1
LOOPB    i ← i + 1
         OUTREG(i + j (L − 1)) ← INREG(i(M − 1) + j)
         IF (i < L) GO TO LOOPB
         i ← 0
         IF (j < M) GO TO LOOPA
         RETURN
```

The desirability of interleaving for the correction of burst errors is evident when considering the case of an error burst input to the de-interleaving circuit shown in FIG. 10. The circuit connections between the input and output registers 214 and 220, respectively, evenly distribute the errors throughout the output register 220. If M is equal to 4 and the error burst is shorter than L errors, then there will be less than one error in each group of 4 consecutive bits in the output register 220, and the rate one-half convolutional code such as that generated by the encoder shown in FIG. 8 will enable the correction of these errors.

Figure 11:
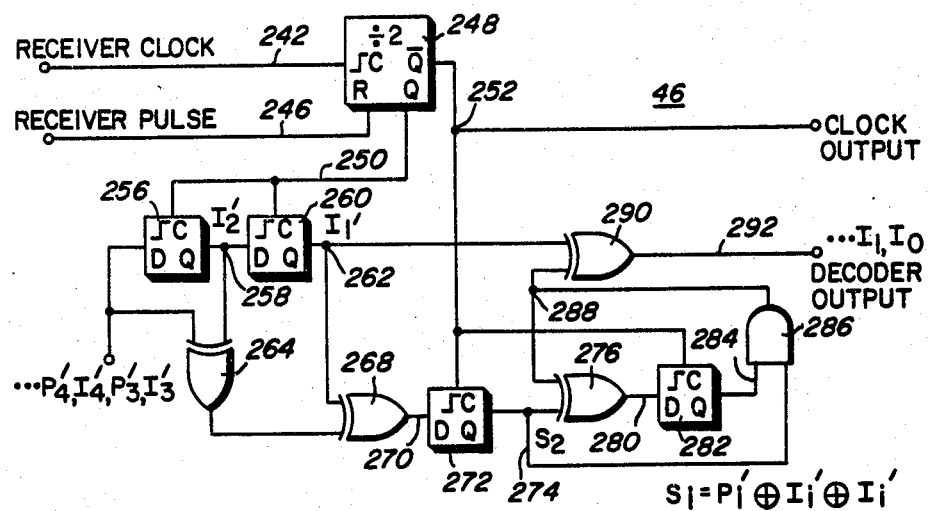
FIG. 11 is a schematic diagram of the logic circuit for implementing the convolutional decoding and error correction operation corresponding to the encoding operation in FIG. 8.

A rate one-half convolutional decoder, generally designated 46, is shown in FIG. 11. Decoder 46 operates in an inverse manner to encoder 30 shown in FIG. 8. This convolutional decoder first separates the parity and input bits which is actually done by using two out-of-phase clocks generated by the digital divider 248. The digital divider is reset by the receiver frame sync pulse on line 246 which must be generated so that the first bit after the frame sync pulse is recognized as an information bit. Thus the information bits will be serially shifted into registers 256 and 260. The consecutive information bits will be logically combined with parity bits by exclusive-OR gates 264 and 268 so that the exclusive-OR of the parity bit and the two information bits appear on line 270 which is the input to shift register 272. Shift registers 272 and 282 comprise what is termed a syndrome register. The outputs of these two registers are combined using lines 274 and 284 by an AND gate 286. When the AND gate output on line 288 is high, an error has occurred in the information bits, and the error is corrected by exclusive-OR gate 290 so that an error-corrected information output is available on line 292. But note that if an error did occur, this error would be on line 262, and the input to gate 268 would be incorrect. Thus the output on line 270 would be incorrect, and the value in shift register 272 would be incorrect. The output on line 274 must be corrected by exclusive-OR gate 276 so that an error-corrected output will appear on line 280. This ensures that the value shifted into register 282 will be correct to determine whether the next information bit is correct.

The combiner means 50 of the decoder in FIG. 3 can be a similar combining means to the combining means 28 in the encoder of FIG. 2. The autosync frames stored in storage means 48 corresponds to the autosync frame in storage means 26 of the encoder. As with the encoder combiner means 28, the combiner means 50 of the decoder could be an exclusive-OR gate which serially accepts the convolutional decoder output and serially accepts the autosync frame. Thus the autosync frame storage means 48 could be, for example, the strapped input of a parallel-input serial-output shift register.

The cyclic block decoder, generally designated 52, is shown in FIG. 12. Decoder 52 recalculates the extra bits at the receiver and compares these bits with the extra bits that were received. if the recalculated bits do not match the received bits, then an error is detected. This can be accomplished with an exclusive-OR gate, such as gate 314, since the exclusive-OR gate result would be a logical one only if the bits do not match. The logic circuit implementation of the cyclic block decoder 52 performs the inverse function of the cyclic block encoder 24 shown in FIG. 7. The error detect output of decoder portion 320, also called a syndrome output, appears on a line 322. A gate 324 is activated via a timer line 306 when the syndrome output on line 322 indicates whether an error has occurred. The output of gate 324 is fed into an SR flip-flop 26 which is dampled by a D flip-flop 328. The SR flip-flop should be triggered when any of the comparisons of the recalculated bits and the received bits indicates an error. The D flip-flop 328 remembers whether any errors occurred and generates the error-detect signal on a line 330. The timing circuits 300 and 304 are similar to the corresponding circuits 118 and 110 of the encoder in FIG. 7. The decoded data output bits are recovered at the K outputs of serial to parallel shift register 332.

Figure 13B:
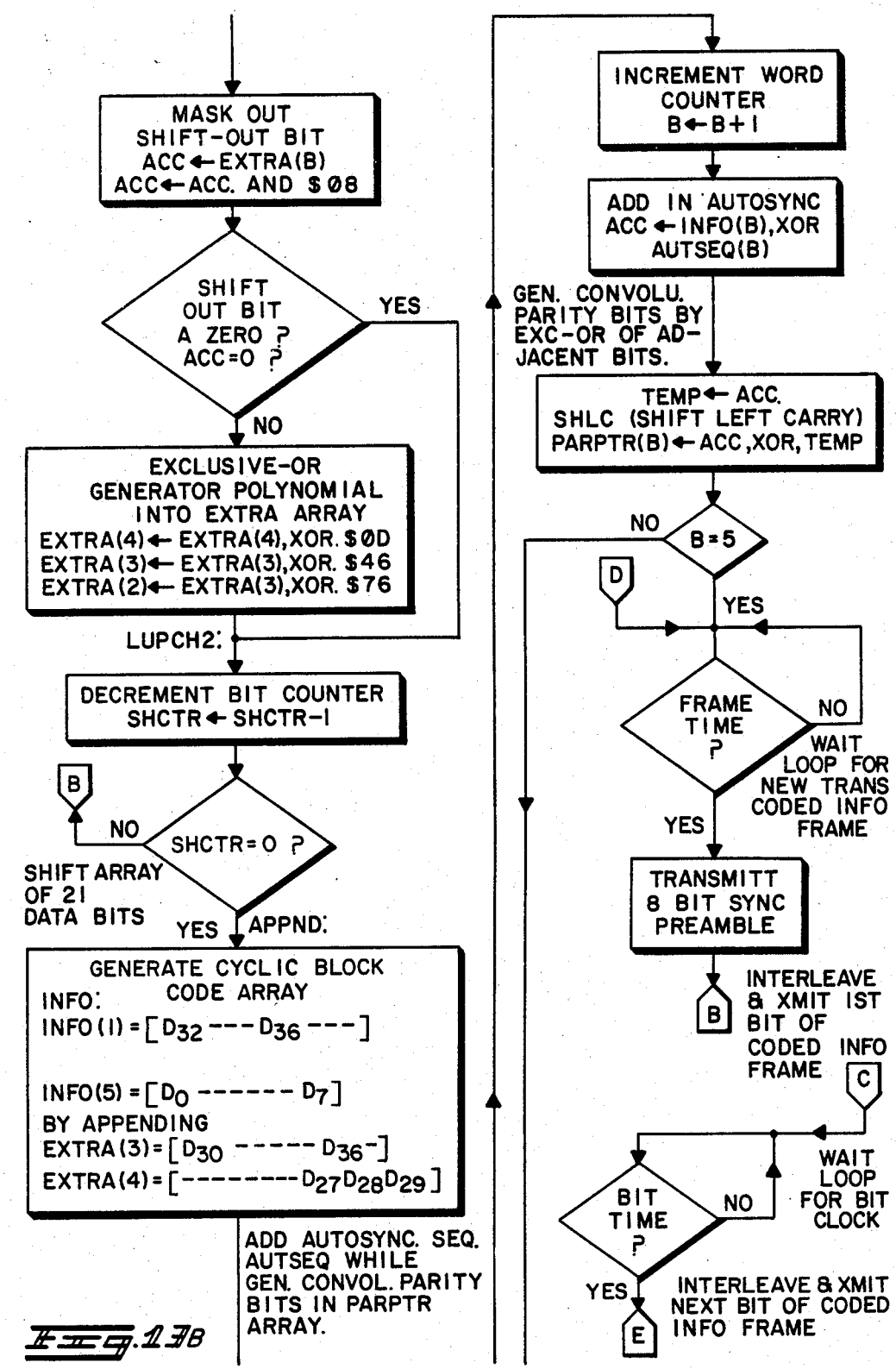
FIG. 13 comprised of FIGS. 13A through D collectively form a flow chart including steps which may be utilized by a microprocessor for implementing the encoding process in a mobile trunked dispatch system.
Figure 11C:
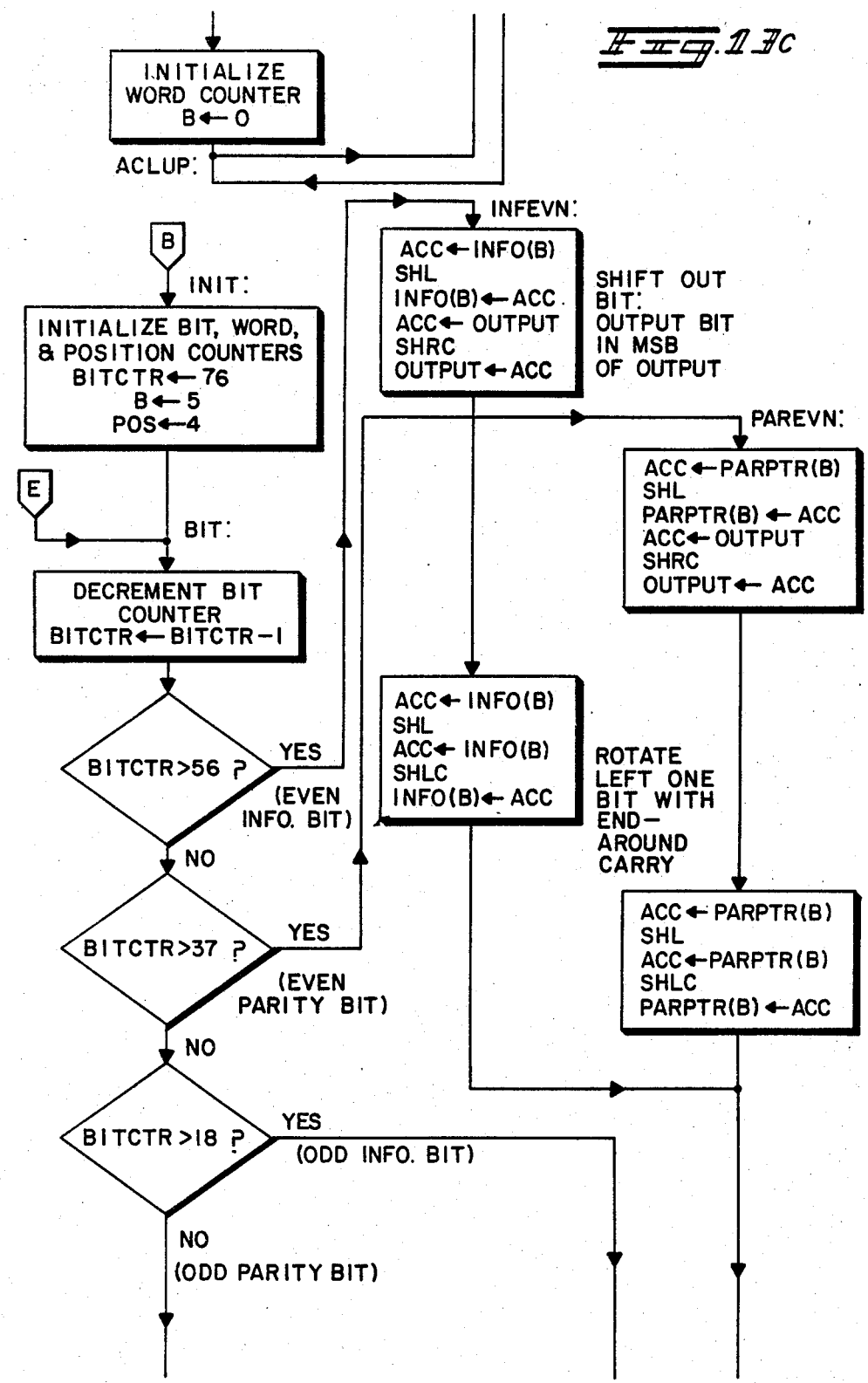
Figure 14C:
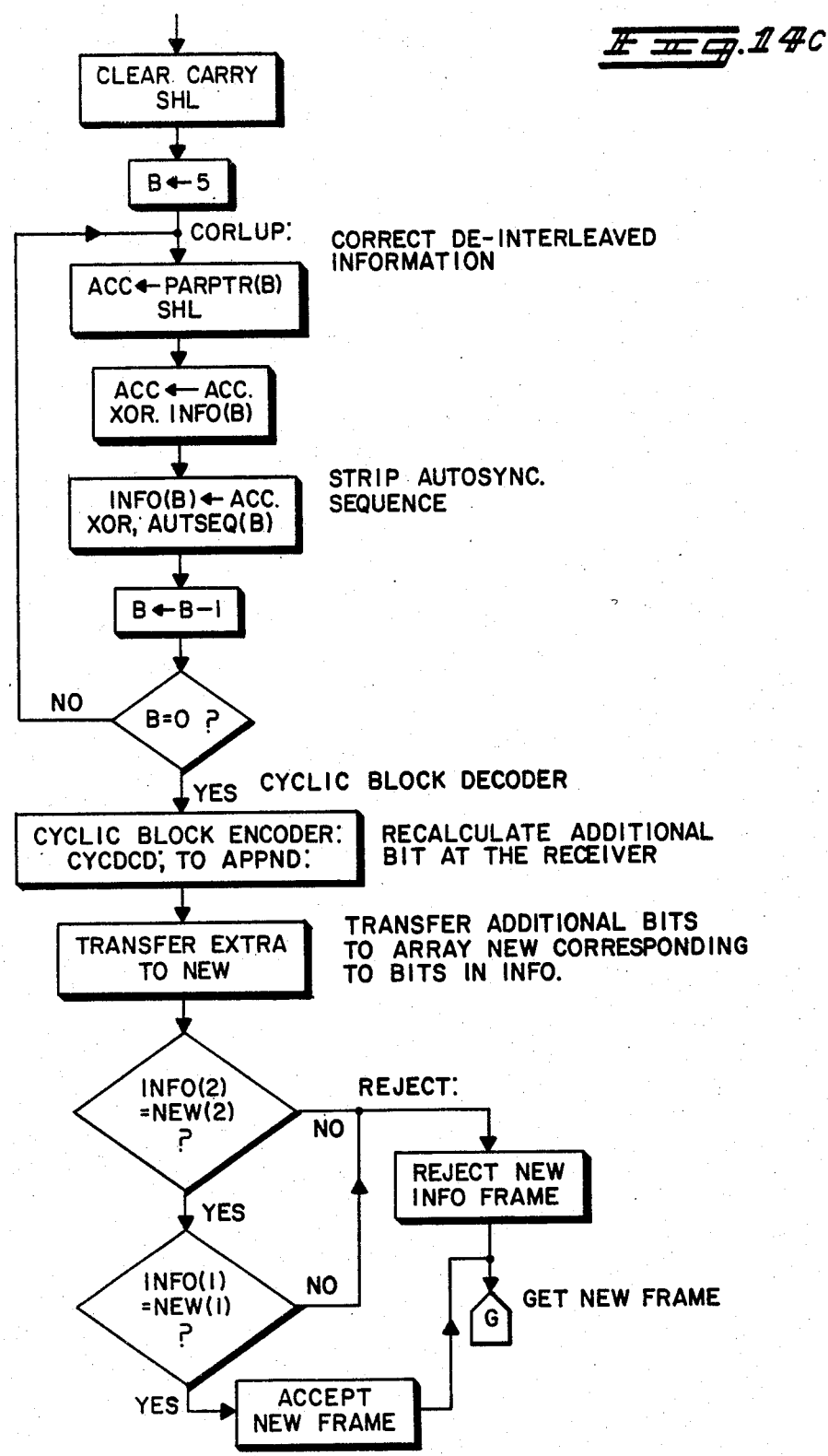
FIG. 14 comprised of FIGS. 14a through E collectively form a flow chart including steps which may be utilized by a microprocessor for implementing the decoding process in a mobile trunked dispatch system.
Figure 14D:
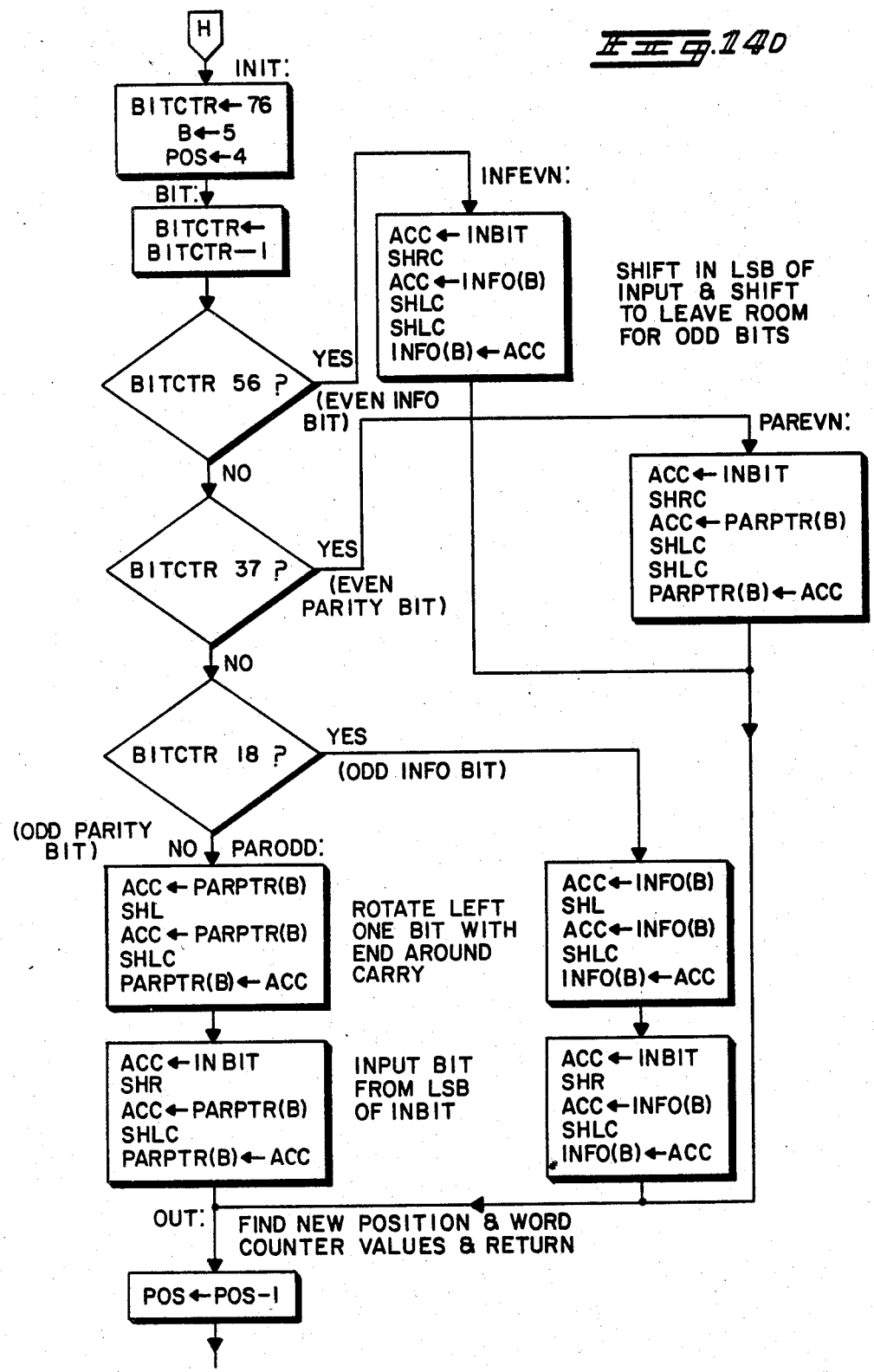

As an illustration of how the encoder-decoder can be implemented in a typical data communications system, the encoder-decoder steps, as they may be embodied in software of a mobile communications trunked dispatch system, are shown in the flow charts of FIGS. 13 and 14. FIGS. 13A through D collectively illustrate the encoding steps. FIGS. 14A through E collectively illustrate the decoding steps. These steps will now be self-explanatory to those skilled in the art in view of the comments and the foregoing description of the encoder-decoder operation.

While embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. In a data communications system for the transmission and reception of a data bit stream, the improvement comprising:
an encoder for receiving information and processing said information into the data bit stream to be transmitted, said encoder comprising;
cyclic block encoder means for receiving information and producing an error detectable encoded bit stream corresponding thereto;
encoder storage means having a predetermined autosynchronization sequence stored therein; said autosynchronization sequence selected to optimize, at a decoder, the generation of errors during an out-of-synchronization condition to enable determination of out-of-synchronization conditions between said encoder and decoder;
encoder combining means for combining said autosynchronization bits from the encoder storage means with the bit stream from said cyclic block encoder means to produce a concatenated bit stream; and
convolutional encoder means for receiving said concatenated bit stream from the encoder combining means and producing an error correctable encoded data bit stream corresponding thereto; and
a decoder for receiving and processing said data bit stream to recover said information, said decoder comprising;
convolutional decoder means for receiving said data bit stream and producing an error corrected bit stream;
decoder storage means having a predetermined sequence of autosynchronization bits stored therein, the predetermined sequence of autosynchronization bits corresponding to the autosynchronization bits stored in said encoder storage means;
decoder combining means for combining said error corrected bit stream from the convolutional decoder means with said autosynchronization bit sequence from the decoder storage means and to provide a block encoded bit stream; and
cyclic block decoder means for decoding said block encoded bit stream to recover said information, said cyclic block decoder means further producing an output indicating the presence of errors in the recovered data bit stream when said decoder is in synchronization with said encoder.

2. The data communications system of claim 1, wherein said data bit stream is comprised of a total of K bits; said cyclic block encoder means produces an error detectable encoded bit stream of a total of N greater than K bits; and said convolutional encoder means is a rate one-half convolutional encoder which produces an error correctable encoded data bit stream of 2 times the quantity N+1 bits, where N and K are predetermined integers.

3. The data communications system of claim 2, said encoder further comprising means for interleaving said error correctable encoded bit stream from said convolutional encoder means, and said encoder further comprising means for de-interleaving said recovered data bit stream from said cyclic block decoder means, for enhanced burst error protection.

4. A method for enhancing the transmission and reception of data in a digital communications system comprising the steps of encoding a data bit stream by:
error detection encoding said data bit stream with a cyclic block encoder to produce an error detectable bit stream;
combining a predetermined sequence of autosynchronization bits, selected to optimize the generation of errors detected in an error detection decoding step for an out-of-synchronization condition, with said error detectable bit stream, thereby producing a concatenated bit stream;
error correction encoding said concatenated bit stream with a convolutional encoder to produce an error correctable encoded bit stream; and
decoding said bit stream by:
decoding the convolutional encoding of said bit stream with a convolutional decoder to correct errors and produce an error corrected bit stream;
combining a predetermined sequence of autosynchronization bits, corresponding to the sequence of autosynchronization bits used by the encoder with said error corrected bit stream, to produce a block encoded signal having decodable cyclic block codes; and
decoding the cyclic block encoding of said error corrected bit stream with a cyclic block decoder to detect errors and produce a decoded data bit stream and an error detect signal when the encoding steps at the encoder are in synchronization with the decoding steps at the decoder.

5. The method of claim 4, wherein said data bit stream is comprised of a total of K bits and wherein;
the step of error detection encoding includes a step of cyclic block encoding said K bit data bit stream to produce an encoded error detectable bit stream comprised of a total of N greater than K bits;
the step of error correction encoding includes a step of convolutional encoding said N bit error detectable bit stream to produce a rate one-half convolutional error correctable encoded bit stream comprised of a total of 2 times the quantity N+1 bits, where N and K are predetermined integers;
the step of decoding the convolutional encoding of said bit stream includes a step of convolutional decoding said rate one-half convolutional error correctable encoded bit stream of 2 times the quantity N+1 bits to produce said N bit error detectable bit stream; and
the step of decoding the cyclic block encoding includes a step of cyclic block decoding said N bit encoded error detectable bit stream to produce said K bit data stream.

6. The method of claim 4 wherein;
the steps of encoding said data bit stream further comprises a step of interleaving the bits of said error correctable encoded bit stream after the step of error correction encoding; and
the steps of decoding said data bit stream further comprises a step of de-interleaving the bits of said bit stream prior to the step of decoding the convolutional encoding of the bit stream.

7. In a trunked dispatch system for mobile radio communication using a digital control channel between an encoder for encoding data for transmission on said digital control channel of said trunked dispatch system, and a decoder for receiving and processing the encoded data transmitted on said control channel to recover the data, said encoder comprising:

cyclic block encoder means for receiving the data for transmission on said digital control channel and producing an error detectable cyclic block code corresponding thereto;

storage means for having an autosynchronization frame stored therein, said autosynchronization frame selected to optimize the generation of errors at the decoder caused by an out-of-synchronization condition between said encoder and decoder;

modulo-2 adder means for performing a bit-by-bit exclusive-OR of said error detectable block code and said autosynchronization frame and producing a modulo-2 sum;

rate one-half convolutional encoder means for encoding the modulo-2 sum and producing a bit sequence including the modulo-2 sum bits, a flush-out bit, and parity bits; and bit interleaving means for reordering the bits in the output of said convolutional encoder to produce an interleaved bit sequence.

8. The trunked dispatch system in claim 7, wherein said block code generated by said block encoder means consists of a (37, 27) shortened cyclical code; said storage means of said encoder having said autosynchronization frame consists of 37 bits; said sequence generated by said convolutional encoder means consists of 76 bits; said interleaved bit sequence is ordered such that if the modulo-2 sum bits are consecutively numbered from 0 to 36 and the parity bits are consecutively numbered from 0 to 37, as they are generated by said rate one-half convolutional encoder, the interleaved sequence will consist of the even numbered modulo-2 sum bits $I_0$ through $I_{36}$, followed by even numbered parity bits $P_0$ through $P_{36}$, followed by the odd numbered modulo-2 sum bits $I_0$ through $I_{35}$ and said flush-out bit, followed by the odd numbered parity bits $P_1$ through $P_{37}$.

9. In a trunked dispatch system for a mobile radio communication using a digital control channel between an encoder for encoding data for transmission on said digital control channel and a decoder for receiving and processing the data transmitted on said control channel to recover the data, the decoder comprising;

de-interleaving means for receiving said encoded data and producing an error correctable bit sequence;

rate one-half convolutional decoder means for decoding said error correctable bit sequence and producing an error corrected bit sequence;

storage means for having an autosynchronization frame stored therein;

modulo-2 adder means for performing a bit-by-bit exclusive-OR of said error corrected bit sequence and the stored autosynchronization frame to produce a decoded modulo-2 sum; and cyclic block decider means for receiving said decoded modulo-2 sum and producing decoded data bits and an error detect signal.

10. The trunked dispatch system in claim 9, wherein said decoder consists of said bit de-interleave means for receiving a 76 bit sequence; said de-interleaved circuit wherein if said 76 bit sequence is consecutively labeled $A_0, B_0, C_0, D_0; A_1, B_1, C_1, D_1$; and so on, the de-interleave circuit generates the sequence $A_0, A_1$, through $A_{18}; B_0, B_1$, through $B_{18}; C_0, C_1$, through $C_{18}; D_0, D_1$, through $D_{18}$; said convolutional decoder error corrects the 76 bit output of said de-interleave circuit and produces a 37 bit error corrected code sequence; said storage means of said decoder has said autosynchronization frame consisting of 37 bits; and said cyclical block decoder decodes a (37, 27) shortened cyclical code.

* * * * *